US 9,099,919 B2

(12) United States Patent
Jing et al.

(10) Patent No.: US 9,099,919 B2
(45) Date of Patent: Aug. 4, 2015

(54) SINGLE-INDUCTOR-MULTIPLE-OUTPUT REGULATOR WITH SYNCHRONIZED CURRENT MODE HYSTERETIC CONTROL

(75) Inventors: Xiaocheng Jing, Hong Kong (CN); Kwok Tai Philip Mok, Hong Kong (CN)

(73) Assignee: THE HONG KONG UNIVERSITY OF SCIENCE AND TECHNOLOGY, Hong Kong (HK)

( * ) Notice: Subject to any disclaimer, the term of this patent is extended or adjusted under 35 U.S.C. 154(b) by 220 days.

(21) Appl. No.: 13/461,576

(22) Filed: May 1, 2012

(65) Prior Publication Data
US 2012/0286576 A1    Nov. 15, 2012

Related U.S. Application Data

(60) Provisional application No. 61/457,660, filed on May 9, 2011.

(51) Int. Cl.
*H02M 3/158* (2006.01)
*H02M 3/156* (2006.01)
*H02M 1/00* (2007.01)

(52) U.S. Cl.
CPC .............. *H02M 3/156* (2013.01); *H02M 3/158* (2013.01); *H02M 2001/009* (2013.01)

(58) Field of Classification Search
CPC ..................... H02M 3/158; H02M 2001/0067; H02M 2001/008
USPC ........................ 307/12, 30; 323/267, 268, 271
See application file for complete search history.

(56) References Cited

U.S. PATENT DOCUMENTS

| 6,075,295 | A  | 6/2000  | Li |
| 6,181,120 | B1 | 1/2001  | Hawkes et al. |
| 6,552,917 | B1 | 4/2003  | Bourdillon |
| 6,628,106 | B1 | 9/2003  | Batarseh et al. |
| 6,628,109 | B2 | 9/2003  | Rincon-Mora |
| 6,636,022 | B2 | 10/2003 | Sluijs |
| 7,061,214 | B2 | 6/2006  | Mayega et al. |
| 7,132,765 | B2 | 11/2006 | Premont et al. |

(Continued)

OTHER PUBLICATIONS

Belloni et al., "A 4-output single inductor dc-dc buck converter with self-boosted switch drivers and 1.2A total output current," IEEE 2008 International Solid-State Circuits Conference (ISSCC 2008), Session 24.6: 444-445 and 626 (Feb. 6, 2008).

(Continued)

*Primary Examiner* — Harry Behm
*Assistant Examiner* — Matthew Grubb
(74) *Attorney, Agent, or Firm* — Leydig, Voit & Mayer, Ltd.

(57) ABSTRACT

A single-inductor-multiple-output (SIMO) DC-DC switching regulator with a current-mode hysteretic control technique having an ultra-fast transient response to suppress cross-regulation is provided. The DC-DC switching regulator includes: at least one power source for providing electrical energy; an inductive energy storage element for accumulating and transferring the electrical energy from the input power source to a plurality of outputs; a main switch for controlling energy accumulation at the inductive energy storage element; a plurality of output switches for controlling energy transfer to each of the plurality of outputs; a freewheel switch coupled in parallel with the inductive energy storage element; and a controller, configured to coordinate the plurality of output switches and the main switch.

20 Claims, 14 Drawing Sheets

(56) References Cited

U.S. PATENT DOCUMENTS

| | | | |
|---|---|---|---|
| 7,224,085 | B2 | 5/2007 | Chen et al. |
| 7,256,568 | B2 | 8/2007 | Lam et al. |
| 7,432,614 | B2* | 10/2008 | Ma et al. .................. 307/31 |
| 7,521,890 | B2 | 4/2009 | Lee et al. |
| 7,868,596 | B2 | 1/2011 | Alessandro et al. |
| 8,049,472 | B2 | 11/2011 | Easwara et al. |
| 2007/0145830 | A1 | 6/2007 | Lee et al. |
| 2008/0231115 | A1* | 9/2008 | Cho et al. .................. 307/41 |
| 2009/0040791 | A1* | 2/2009 | Qahouq et al. ............. 363/21.01 |
| 2009/0279224 | A1 | 11/2009 | Ayyanar et al. |
| 2009/0309567 | A1 | 12/2009 | Morroni et al. |
| 2010/0039080 | A1 | 2/2010 | Schoenbauer et al. |
| 2010/0283322 | A1 | 11/2010 | Wibben |
| 2011/0043181 | A1 | 2/2011 | Jing et al. |

OTHER PUBLICATIONS

Huang et al., "Single-inductor dual-output DC-DC converters with high light-load efficiency and minimized cross-regulation for portable devices," IEEE 2008 Symposium on VLSI Circuits, 132-133 (Jun. 18-20, 2008).

Koon et al., "Integrated charge-control single-inductor dual-output step-up step-down converter," IEEE 2005 International Symposium on Circuits and Systems (ISCAS 2005), 4: 3071-3074 (May 23-26, 2005).

Kwon et al., "Single-inductor multiple-output switching DC-DC converters," IEEE Transactions on Circuits and Systems II: Express Briefs, 56 (8): 614-618 (Aug. 2009).

Le et al., "A single-inductor switching DC-DC Converter with 5 outputs and ordered power-distributive control." IEEE 2007 International Solid-State Circuits Conference (ISSCC 2007), Session 29.9: 534-535 and 620 (Feb. 14, 2007).

Lee et al., "A PLL-Based High Stability Single-Inductor 6-channel output DC-DC Buck converter," IEEE 2010 International Solid-State Circuits Conference (ISSCC 2010), Session 10.3: 200-201 and 978 (Feb. 9, 2010).

Ma et al., "A pseudo-CCMDCM SIMO switching converter with freewheel switching," IEEE J. Solid-State Circuits, 38 (6): 1007-1014 (Jun. 2003).

Ma et al., "Single-inductor multiple-output switching converters with time-multiplexing control in discontinuous conduction mode." IEEE J. Solid-State Circuits, 38 (1): 89-100 (Jan. 2003).

Pizzutelli et al., "Novel control technique for single inductor multiple output converters operating in CCM with reduced cross-regulation," Twenty-Third Annual IEEE Applied Power Electronics Conference and Exposition 2008 (APEC 2008): 1502-1507 (Feb. 24-28, 2008).

Seol et al., "A synchronous multioutput step-up/down DC-CDC converter with return current control," IEEE Transactions on Circuits and Systems II: Express Briefs, 56 (3): 210-214 (Mar. 2009).

Sharma et al., "A single inductor multiple output converter with adaptive delta current mode control," IEEE 2006 International Symposium on Circuits and Systems (ISCAS 2006), 5643-5646 (May 21-24, 2006).

Sze et al., "Integrated single-inductor dual-input dual-output boost converter for energy harvesting applications," IEEE 2008 International Symposium on Circuits and Systems (ISCAS 2008), 2218-2221 (May 18-21, 2008).

Trevisan et al., "FPGA control of SIMO DC-DC converters using load current estimation," 31st Annual Conference of IEEE Industrial Electronics Society 2005 (IECON 2005), 2243-2248 (Nov. 6-10, 2005).

Woo et al., "Load-independent control of switching DC-DC converters with freewheeling current feedback," IEEE 2008 International Solid-State Circuits Conference (ISSCC 2008), Session 24.7: 446-447 and 626 (Feb. 6, 2008).

Woo et al., "Load-independent control of switching DC-DC converters with freewheeling current feedback," IEEE J. Solid-State Circuits, 43 (12): 2798-2808 (Dec. 2008).

Xu et al., "A 90% peak efficiency single inductor dual output buck boost converter with extended PWM control," IEEE 2011 International Solid-State Circuits Conference (ISSCC 2011), Session 22.7: 394-395 and 978 (Feb. 23, 2011).

Zhang et al. "Digitally controlled integrated pseudo-CCM SIMO converter with adaptive freewheel current modulation," Twenty-Fifth Annual IEEE Applied Power Electronics Conference and Exposition 2010 (APEC 2010), 284-288 (Feb. 21-25, 2010).

\* cited by examiner

1000

SINGLE-INDUCTOR-MULTIPLE-OUTPUT REGULATOR WITH SYNCHRONIZED CURRENT MODE HYSTERETIC CONTROL

CROSS-REFERENCE TO RELATED APPLICATIONS

This patent application claims the benefit of U.S. Provisional Patent Application No. 61/457,660, filed May 9, 2011, which is incorporated by reference.

FIELD

This invention relates in general to DC-to-DC converters and more particularly to a single-inductor-multiple-output switching regulator with fast load transient response, low cross-regulation, high efficiency over the entire loading range, and flexible driving capability.

BACKGROUND

Different supply voltages are required by portable electronic devices such as netbooks, personal-digital-assistance (PDA) phones and portable media player (PMP). DC-DC switching converters are commonly used as power supplies for these devices because of their high efficiency. Single-inductor-multiple-output (SIMO) DC-DC converters are an important component to provide multiple supply voltages for these applications. With a reduced number of inductors, SIMO DC-DC converters provide a solution with relatively small size and reduced cost.

To achieve a high performance SIMO DC-DC converter, many design parameters should be taken into account such as load transient response, cross-regulation, and output ripple. U.S. Patent Pub. No. 2008/0231115, U.S. Pat. No. 7,432,614 and U.S. Patent Pub. No. 2011/0043181 describe some conventional control techniques, such as Ordered-Power-Distributive-Control and Time-Multiplexing or Sequential-Control for SIMO DC-DC converters. For these converters, the required energy is determined by error amplifiers. The load transient response is thus limited by the compensator.

U.S. Patent Pub. No. 2008/0231115 describes a control method where the inductor accumulates energy once and transfers the energy to multiple outputs one by one based on the predefined priority in one cycle where the last output stage uses peak-current-mode control. This last stage determines the response and the cross-regulation of the converter. For this type of control, if the first output has a heavy load, the rest of the outputs might not be able to get energy for many cycles due to the defined energy transfer priority, which induces voltage drops at all the other outputs.

For converters utilizing control methods similar to those described in U.S. Pat. No. 7,432,614 and U.S. Patent Pub. No. 2011/0043181, the system should operate in Discontinuous-Conduction-Mode (DCM) to minimize cross-regulation, which either limits the power capability of the system or leads to a relative large ripple current and voltage at heavy load. Utilizing Pseudo-Continuous-Conduction-Mode (PCCM) or Continuous-Conduction-Mode (CCM) operation for this type of control will reduce the effectiveness of the cross-regulation suppression, increase the power loss and lead to a complicated design.

SUMMARY

Embodiments of the present invention provide a single-inductor-multiple-output (SIMO) DC-DC switching regulator with a current-mode hysteretic control technique having an ultra-fast transient response to suppress cross-regulation. In one embodiment, a DC-DC switching regulator is provided that includes: at least one power source for providing electrical energy; an inductive energy storage element for accumulating and transferring the electrical energy from the input power source to a plurality of outputs; a main switch for controlling energy accumulation at the inductive energy storage element; a plurality of output switches for controlling energy transfer to each of the plurality of outputs; a freewheel switch coupled in parallel with the inductive energy storage element; and a controller, configured to coordinate the plurality of output switches and the main switch so as to periodically transfer accumulated energy from the inductive energy storage element to each of the plurality of outputs for generating a regulated DC voltage at each of the plurality of outputs. The coordination further includes comparison of output voltages with associated reference voltages, and adjustment of a sequence in which the accumulated energy is transferred to the plurality of outputs.

In a further embodiment, the controller further includes: a clock generator for generating a high frequency clock signal, wherein the clock signal is used to adjust a switching frequency of the regulator based on the load currents; at least one comparator corresponding to each of the plurality of outputs; a comparator for detecting whether the inductor current has reached a peak inductor current level; and a logic and buffer unit for controlling the main switch, the freewheel switch, and the plurality of output switches. The controller may be further configured to adjust a switching frequency of the regulator based on the load currents.

In yet another further embodiment, a method for controlling a DC-DC switching regulator is provided. The method includes: turning on a main switch to accumulate energy at an inductive energy storage element; determining, by a controller, an output to transfer the accumulated energy to based on a comparison between the output and a reference voltage corresponding to the output; determining, by the controller, whether to operate the output in discontinuous conduction mode (DCM) or continuous conduction mode (CCM) based on the loading of the output; and transferring the accumulated energy to the output.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

In general terms, not intended to limit the scope of the invention, embodiments of the present invention provide a single-inductor-multiple-output (SIMO) DC-DC switching regulator with a current-mode hysteretic control technique having an ultra-fast transient response to suppress cross-regulation. All the outputs are controlled by comparators, and the single inductor accumulates energy separately for each output while the phase assignment is determined by the control loop automatically based on the energy required by the individual output.

Automatically determining the phase assignment for each output based on energy required by each output eliminates the power capability limitation of time-multiplexing with fixed time slots for each output. For outputs having large loads, the loop will use several continuous phases operating in CCM to transfer energy, which eliminates the ripple-generation issue associated with conventional sequential-control operation in DCM at heavy loads.

This automatic phase determination also decreases power loss because the loop assigns a low frequency for a light load output and a high frequency for a heavy load output, which is different from conventional control methods. Operation in DCM with low switching frequency at light load condition reduces switching loss. Operation in CCM with a relative high switching frequency at heavy load condition reduces conduction loss, current ripple, and voltage ripple, which is important for many applications.

Predictable noise spectrum is realized by introducing a high frequency clock to synchronize the switching frequency. In an exemplary embodiment, whether operating in CCM or DCM, the switching cycle is initiated by the rising edge of the generated clock (Clk) to make sure the switching frequency is always a multiple fraction of the Clk.

Figure 1:
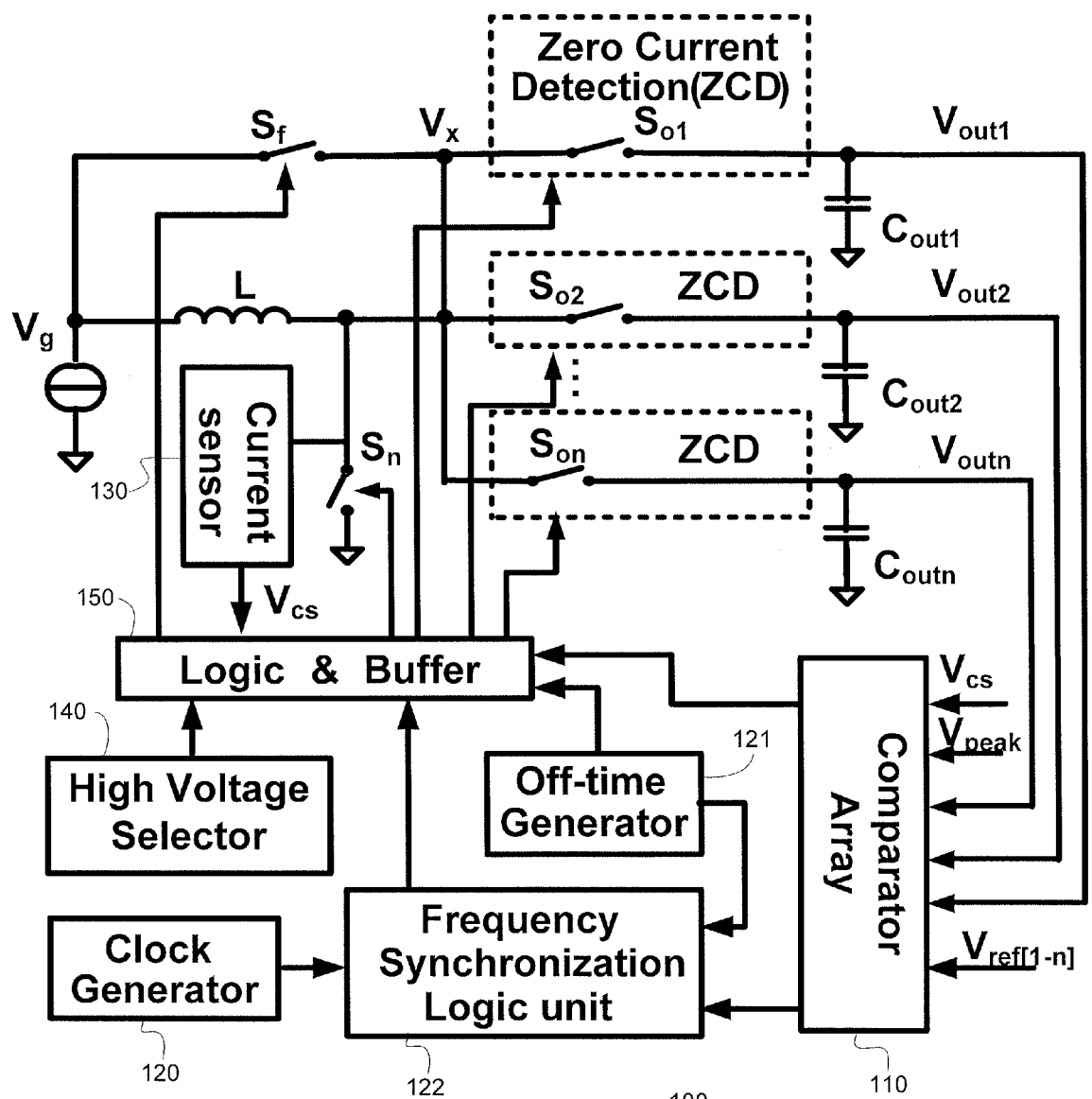
FIG. 1 is a block diagram illustrating the structure of a SIMO boost converter according to an embodiment of the present invention.

Turning now to FIG. 1, FIG. 1 depicts a schematic diagram 100 of a SIMO boost switching regulator with current mode hysteretic-control according to an embodiment of the present invention. The regulator includes several power switches $S_n$, $S_f$, and $S_{o1}$ through $S_{on}$ to control the energy transfer from the input $V_g$ to the outputs $V_{out1}$ through $V_{outn}$. Energy storage elements inductor L and capacitors $C_{out1}$ through $C_{outn}$ are used for lossless accumulation and transfer of energy. Each of the output power switches $S_{o1}$ through $S_{on}$ and the respective output capacitors $C_{out1}$ through $C_{outn}$ form sub-converters with output voltages of $V_{out1}$ through $V_{outn}$. Switch $S_n$ is used to control the amount of energy accumulated at the energy storage element inductor L, switches $S_{o1}$ through $S_{on}$ are used to control the energy transfer from the energy storage element inductor L to corresponding output $V_{out1}$ through $V_{outn}$, and switch $S_f$ is used to short the inductor in DCM operation to prevent ringing. The ringing appears in DCM operation because the conductor L with the parasitic capacitor at switching node $V_x$ will resonate when the switches $S_n$, $S_{o1}$ to $S_{on}$ are turned-off.

The regulator further includes a controller including current sensor 130, logic and buffer unit 150, high voltage selector 140, clock generator 120, frequency synchronization logic unit 122, off-time generator 121, comparator array 110, and zero current detection units. The comparator array 110 detects the output voltages so as to control the energy transfer. $V_{ref[1-n]}$ are reference voltages used to control the regulated output voltage values for $V_{out1}$ through $V_{outn}$ based on the loading requirements of the respective outputs. The reference voltages $V_{ref[1-n]}$ can be set differently or to the same value. According to one exemplary embodiment, the comparator array 110 includes one comparator for each sub-converter, and in addition, another comparator for generating a control signal when the inductor current reaches the peak value.

The regulator further includes a clock generator 120 to generate a high frequency clock signal Clk, an off-time generator 121 to limit the highest frequency of the regulator, and a frequency synchronization logic unit 122 to ensure the turn-on of the regulator is synchronized with the rising edge of the high frequency clock signal Clk. When the energy starts to transfer to any of the outputs, the frequency synchronization logic unit 122 detects the output signal from the comparator array 110 after a certain time period defined by off-time generator 121. If the output signal from the comparator array 110 indicates that a switch is to be turned off or on, the frequency synchronization logic unit 122 will output the signals at the next rising edge of the clock (as shown in further detail below with respect to FIGS. 2-7). Thus, the switching frequency is synchronized to the clock. The regulator also includes a current sensor 130 for sensing the inductor current for peak current control and for over current protection.

Zero current detection (ZCD) is implemented for DCM operation to block negative current flow through the output switches $S_1$ to $S_n$ since these switches can conduct current bidirectionally. It will be appreciated that, in an embodiment, MOSFETs are used to implement these switches. A high voltage selector 140 is used to select the highest voltage from $V_g$ and $V_{outi}$ (where i is an integer from 1 through n) to power the substrate of these MOSFETs. The logic and buffer unit 150 is used for controlling the on-off process of the switches according to the driver signal generated by comparator array 110, off-time generator 121, and frequency synchronization logic unit 122.

Figure 2:
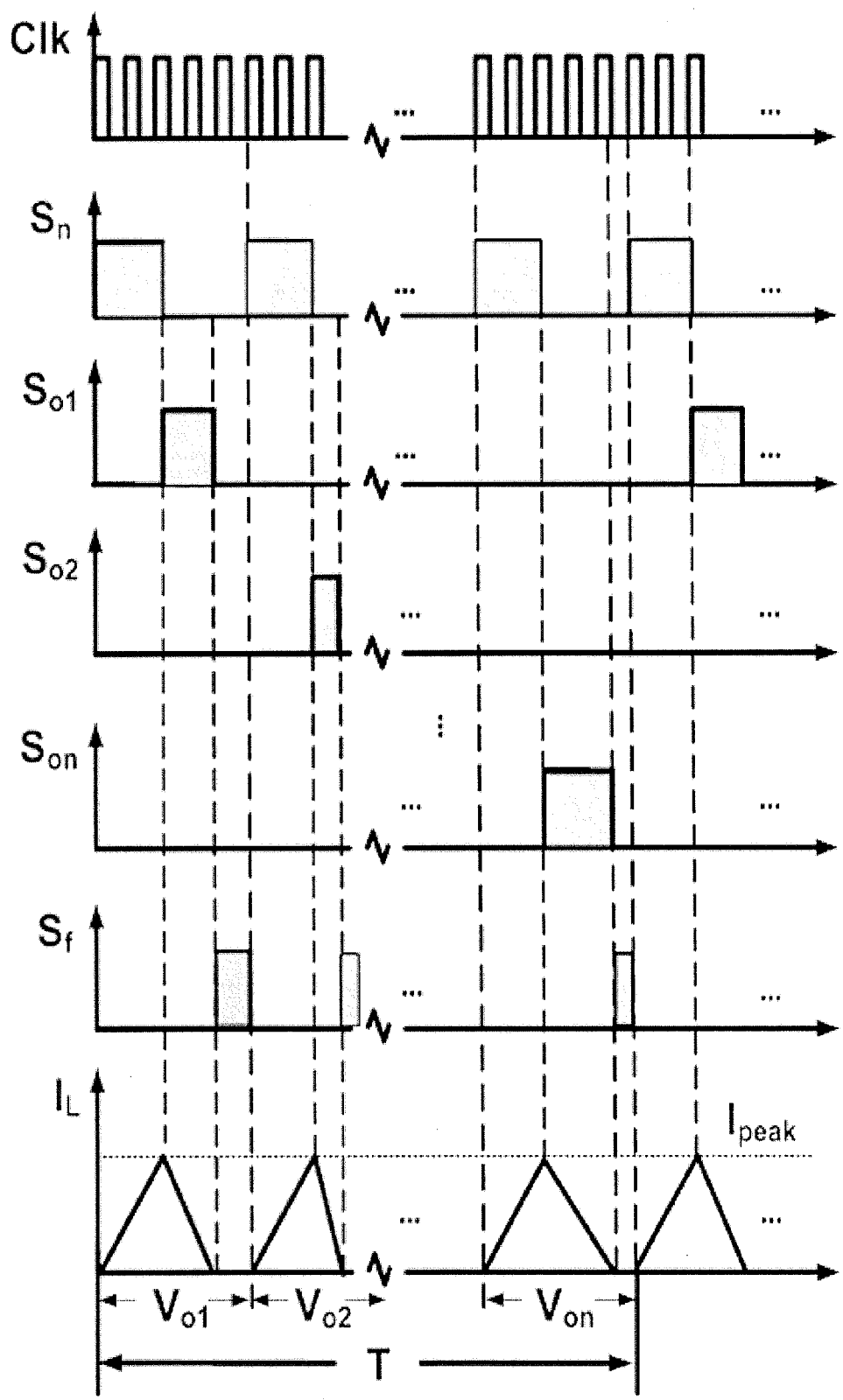
FIG. 2 is a timing diagram illustrating the operation of the SIMO boost converter of FIG. 1 operating in discontinuous conduction mode (DCM) with similar load weights at each output.
Figure 3:
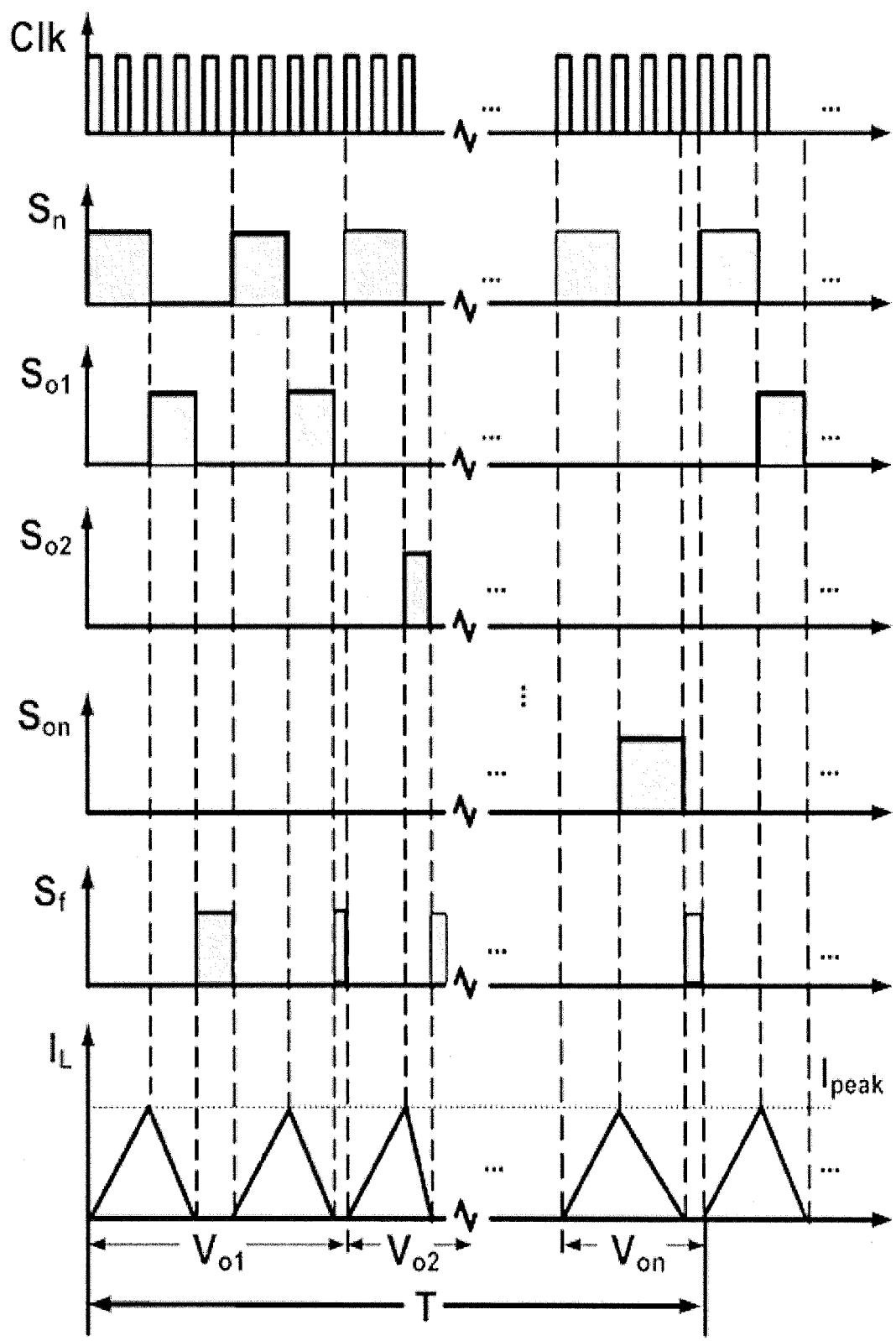
FIG. 3 is a timing diagram illustrating the operation of the SIMO boost converter of FIG. 1 operating in DCM with different load weights at each output.

FIGS. 2 and 3 depict timing diagrams 200 and 300 that illustrate the operational principles of the control method with all outputs operating in Discontinuous-Conduction-Mode (DCM) according to an embodiment of the present invention. When the main switch $S_n$ is triggered on by a rising edge of the clock signal Clk, the inductor current $I_L$ increases with a slope of $V_g/L$. When $I_L$ reaches a peak current level $I_{peak}$ (determined by the current sensor 130 and comparator array 110 as described above), $S_n$ turns off. The comparator array compares the output signals with the reference voltages to determine which output is selected to receive the accumulated energy, and the corresponding output switch $S_{oi}$ turns on (the notation $S_{oi}$ corresponds to the switches $S_{o1}$ through $S_{on}$, which correspond to each output). Then, $I_L$ decreases with a slope of $(V_{oi}-V_g)/L$, transferring the charged inductive energy to the selected output i. As soon as $I_L$ decreases to zero, $S_{oi}$ turns off and $S_f$ turns on.

When $V_{oj}<V_{refj}$, (where $V_{oj}$ corresponds to an output j that may or may not be the same output as output i), at the following rising edge of the Clk, $S_f$ turns off and $S_n$ turns on again to charge the inductor with a slope of $V_g/L$ as before. When $I_L$ reaches the peak current level $I_{peak}$, $S_n$ turns off and output switch $S_{oj}$ turns on depending on the feedback signal from the comparator array. Then, $I_L$ decreases with a slope of $(V_{oj}-V_g)/L$, transferring the charged inductive energy to the selected output j. As soon as $I_L$ decreases to zero, $S_{oj}$ turns off and $S_f$ turns on. This process then continues to repeat as described above during DCM operation. It will be appreciated that if there are multiple outputs for which $V_{oj}<V_{refj}$ is satisfied, energy will be transferred to the outputs one by one based on an order of priority—for example, an ascending order of priority from $V_{o1}$ to $V_{on}$.

It will be appreciated that in DCM operation, energy transfer for each output can be performed alternatively (e.g., when the outputs require similar energy for the loading) as shown in the timing diagram 200 of FIG. 2, or that energy transfer for an output can be performed in consecutive cycles (e.g., for a heavy load) before alternating to a different output (e.g., when the outputs require different amount of energy for the loading) as shown in the timing diagram 300 of FIG. 3.

In an embodiment, if more than one output voltage is less than its corresponding reference voltage, the controller is configured to transfer energy as quickly as possible to all of the outputs needing energy by changing some or all outputs to CCM operation and enabling a high switching frequency. Thus, when some or all outputs are under heavy load, the regulator behaves as shown in FIG. 4, 5, 6, or 7 with all or at least some outputs operating in CCM. When the outputs are under light load, the regulator behaves as shown in FIG. 2 or 3 with all of the outputs operating in DCM.

Figure 4:
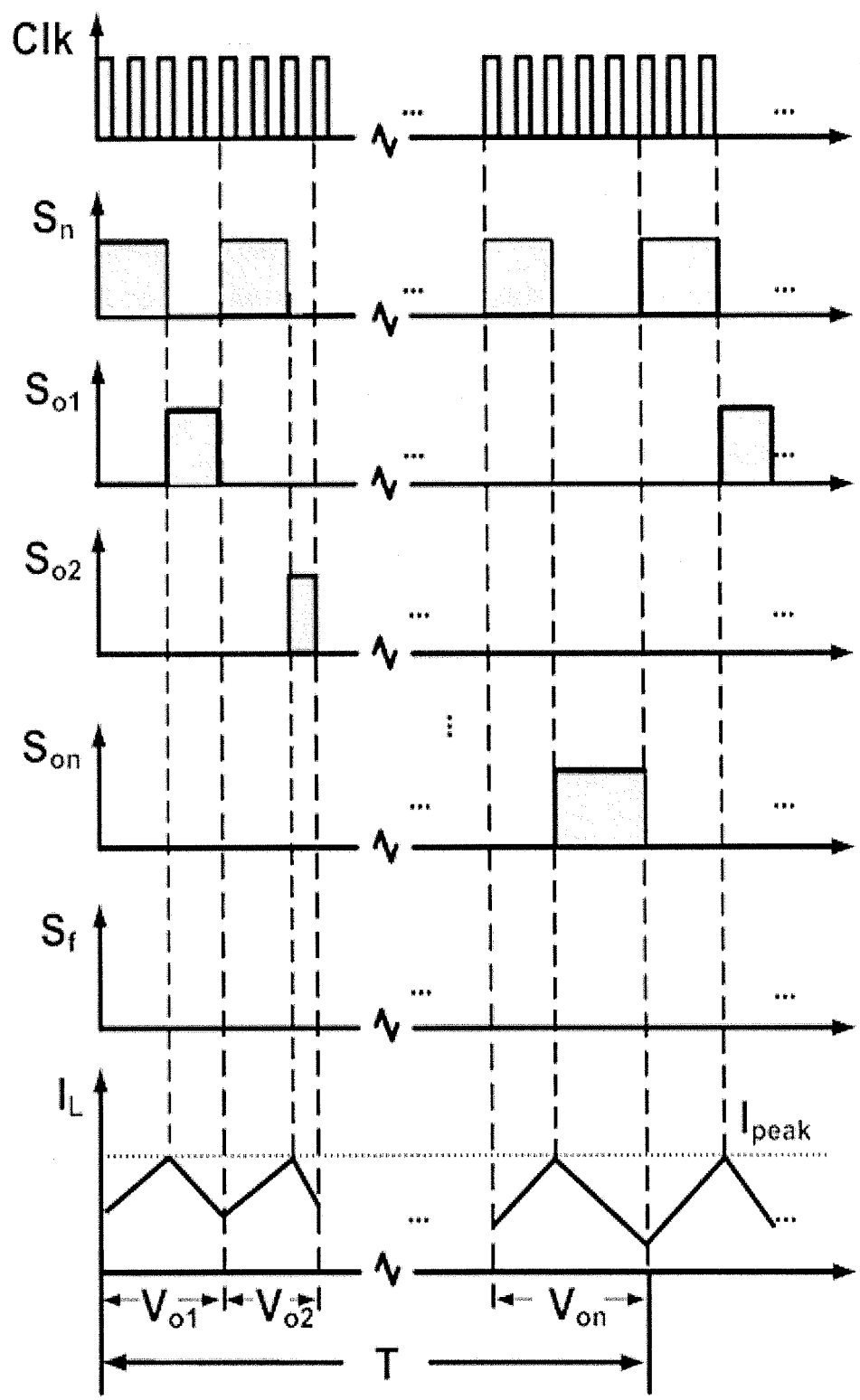
FIG. 4 is a timing diagram illustrating the operation of the SIMO boost converter of FIG. 1 operating in continuous conduction mode (CCM) with similar load weights at each output.
Figure 5:
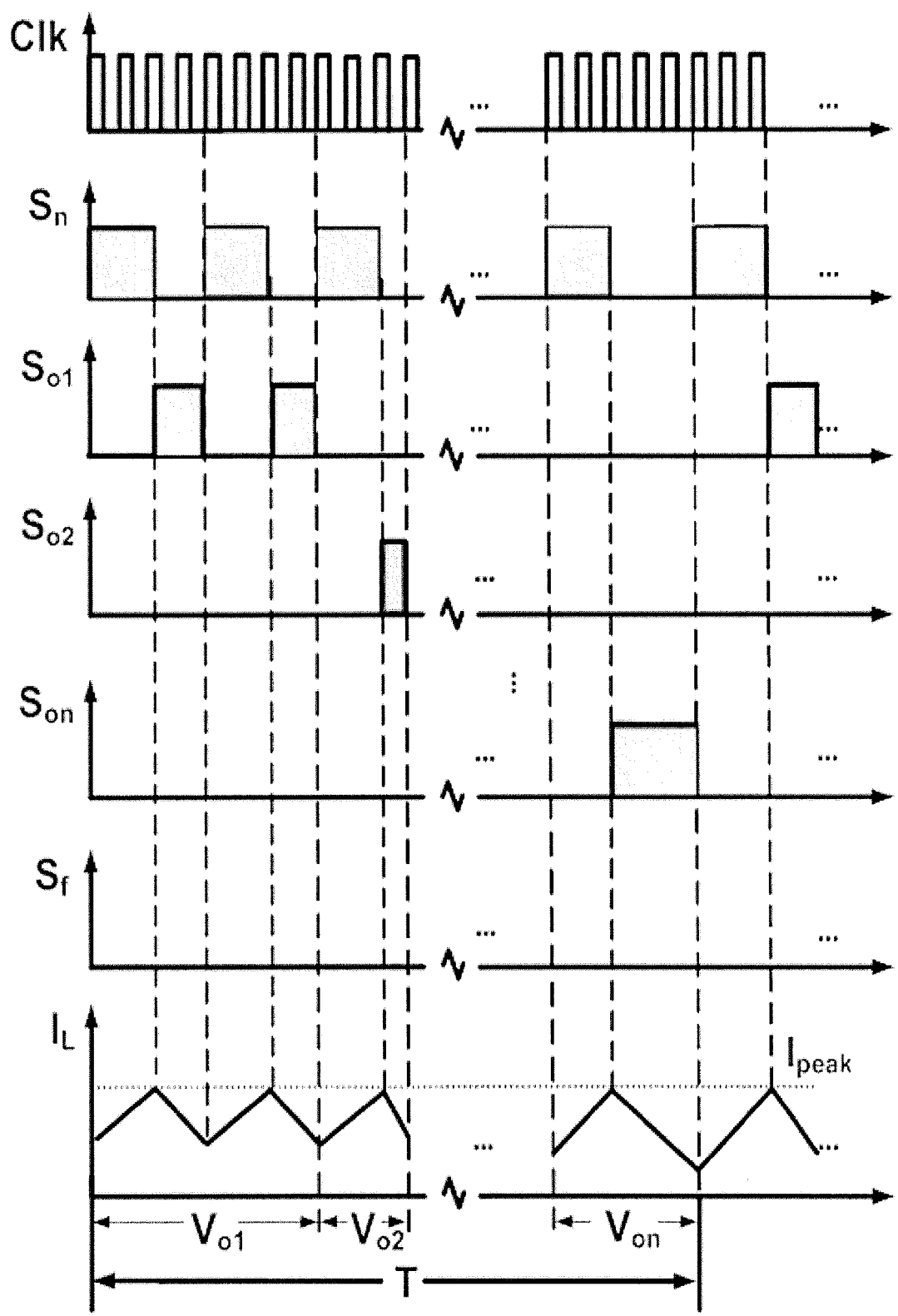
FIG. 5 is a timing diagram illustrating the operation of the SIMO boost converter of FIG. 1 operating in CCM with different load weights at each output.

FIGS. 4 and 5 depict timing diagrams 400 and 500 that illustrate the operational principles of the control method with all outputs operating at Continuous-Conduction-Mode (CCM) according to an embodiment of the present invention. When the main switch $S_n$ is triggered on by a rising edge of the clock signal Clk, the inductor current $I_L$ increases with a slope of $V_g/L$. When $I_L$ reaches the peak current level $I_{peak}$, $S_n$ turns off and an output switch $S_{oi}$ turns on depending on the feedback signal from the comparator array. Then, $I_L$ decreases with a slope of $(V_{oi}-V_g)/L$, transferring the charged inductive energy to the selected output i.

At this stage, if $V_{oi}<V_{refi}$ at a time $T_{off}$ (where $T_{off}$ represents a delay between the main switch being turned off and the time at which the system begins comparing the output voltages with the reference voltages), $S_{oi}$ turns off and $S_n$ turns on again at the following rising edge of the Clk to charge the inductor with a slope of $V_g/L$ (an example of this is shown with $V_{oi}$ being $V_{o1}$ at $T_{off}$ in FIG. 5). When $I_L$ reaches the peak current level $I_{peak}$, $S_n$ turns off and the same output switch $S_{oi}$ turns on. Then, $I_L$ decreases with a slope of $(V_{oi}-V_g)/L$, transferring the charged inductive energy to the selected output i.

When $V_{oi}>V_{refi}$ and when $V_{oj}<V_{refj}$ (where output j is another output which is not output i), at the following rising edge of the Clk, $S_{oi}$ turns off and turns on again to charge the inductor with a slope of $V_g/L$ as before. When $I_L$ reaches the peak current level $I_{peak}$, $S_n$ turns off and the output switch $S_{oj}$ turns on depending on the feedback signal from the comparator array. Then, $I_L$ decreases with a slope of $(V_{oj}-V_g)/L$, transferring the charged inductive energy to the selected output j.

It will be appreciated that in CCM operation, energy transfer for each output can be performed alternatively as shown in the timing diagram 400 of FIG. 4, or that energy transfer for an output can be performed in consecutive cycles (e.g., for a heavy load) before alternating to a different output as shown in the timing diagram 500 of FIG. 5. It will be appreciated that, as shown in FIGS. 4 and 5, the inductor current does not go down to zero and that $S_f$ is not used in CCM operation.

Figure 6:
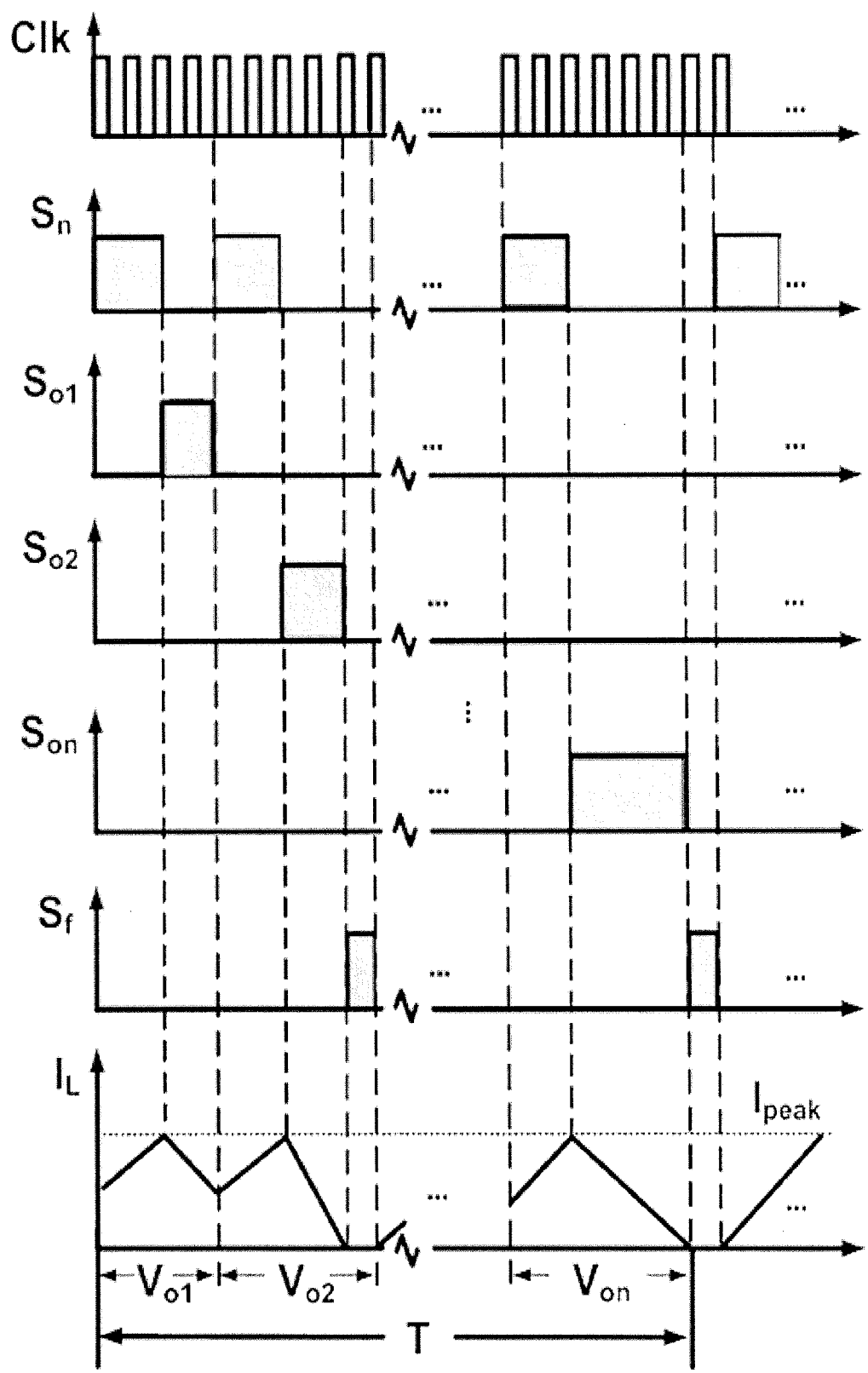
FIG. 6 is a timing diagram illustrating the operation of the SIMO boost converter of FIG. 1 operating in both DCM and CCM for different outputs.
Figure 7:
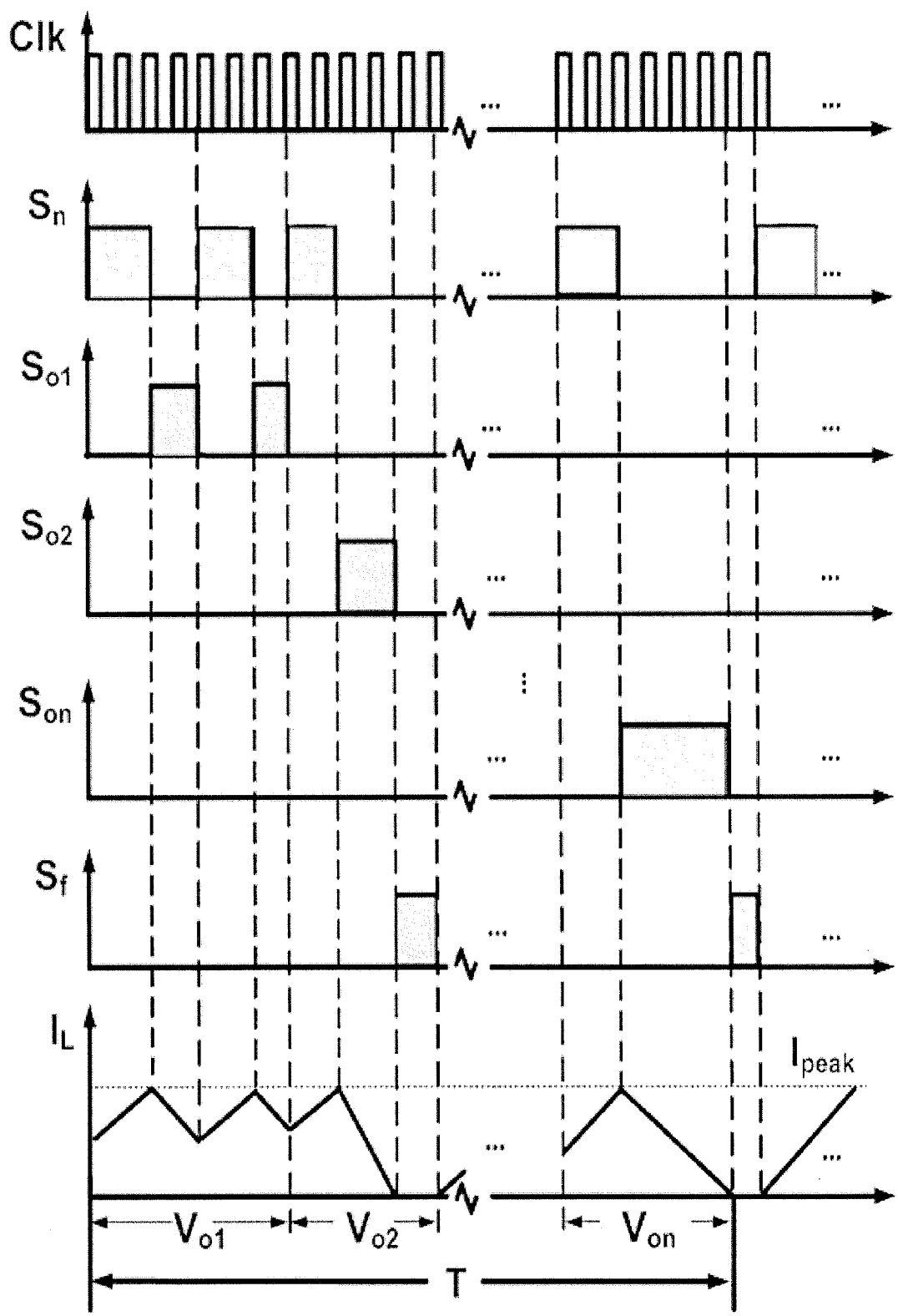
FIG. 7 is a timing diagram illustrating the operation of the SIMO boost converter of FIG. 1 operating in both DCM and CCM for different outputs with larger load difference at each output (larger relative to FIG. 6)

FIGS. 6 and 7 depict timing diagrams 600 and 700 that illustrate the operational principles of the control method with different outputs operating in different modes. Namely, in timing diagrams 600 and 700, subconverter $V_{o1}$ is operating in CCM, and subconverters $V_{o2}$ to $V_{on}$ are operating in DCM. The operational principles with respect to each output, whether operating in CCM or DCM, are similar to what was previously described with respect to FIGS. 2-3 (corresponding to DCM operation) and FIGS. 4-5 (corresponding to CCM operation). Similarly, as described above with respect to FIGS. 2-3 and FIGS. 4-5, it will be appreciated that energy transfer for each output can be performed alternatively as shown in the timing diagram 600 of FIG. 6, or that energy transfer for an output can be performed in consecutive cycles (e.g., for a heavy load) before alternating to a different output as shown in the timing diagram 700 of FIG. 7.

Figure 8:
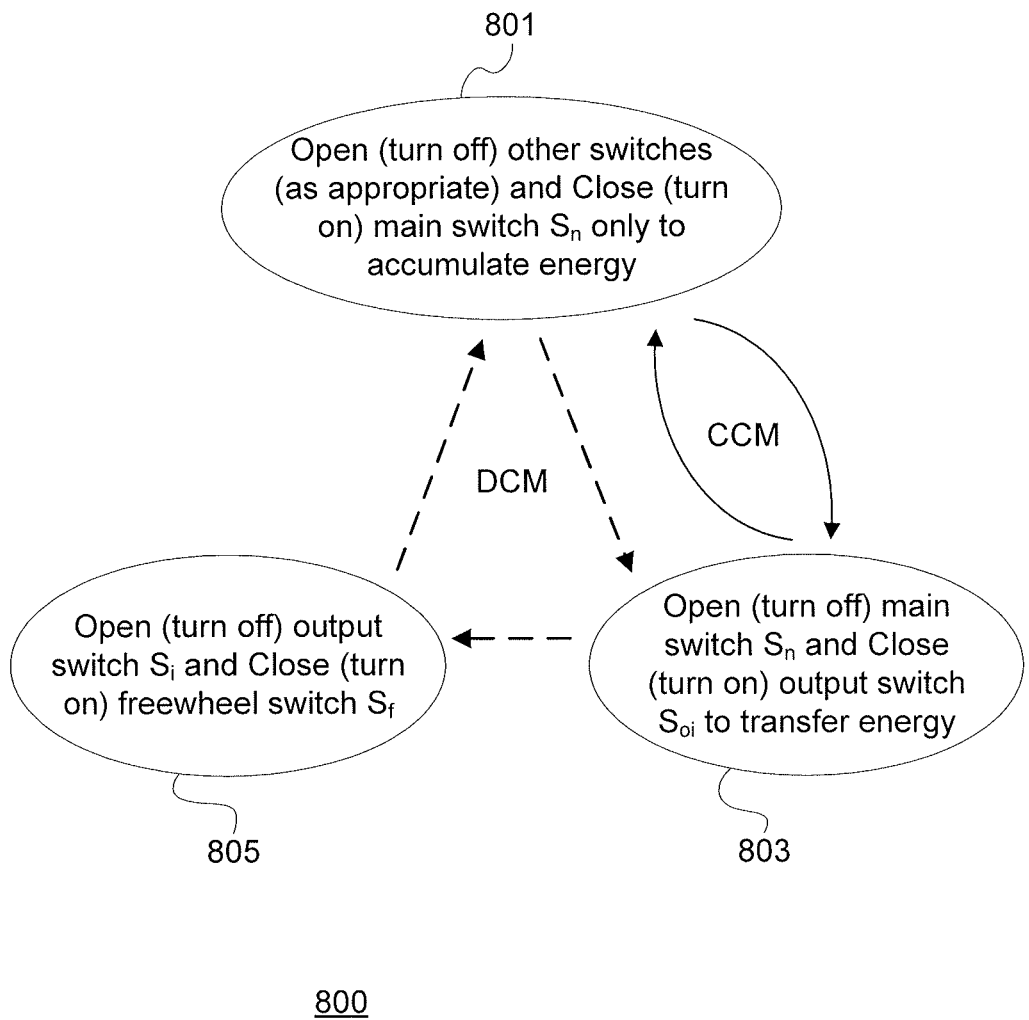
FIG. 8 is a flowchart illustrating the operation of the SIMO boost converter of FIG. 1.

FIG. 8 depicts a flowchart illustrating a process 800 for controlling the SIMO DC-DC converter of FIG. 1 according to an embodiment of the present invention. For CCM operation (shown by the solid lines), the main switch $S_n$ and the output switches ($S_{o1}$ to $S_{on}$) turn on and off alternately to transfer energy from input to output (alternating between stages 801 and 803 in FIG. 8). For DCM operation (shown by the dotted lines), the main switch $S_n$, the output switches ($S_{o1}$ to $S_{on}$), and the freewheeling switch $S_f$ turn on and off alternately to transfer energy from the input to the output (flowing between stages 801, 803, and 805 as depicted in FIG. 8).

Based on the foregoing disclosure, it will be appreciated that with the described current mode hysteretic control method, the sub-converters of the regulator can operate in either DCM or CCM, and each output can be at light load or heavy load. Whether the sub-converters corresponding to each output operate in DCM or CCM is determined by the Zero Current Detection units based on the load current of each output. Additionally, it will be appreciated that the described method also decreases power loss because the loop automatically assigns a low frequency for the light load output and a high frequency for the heavy load output. At light load with predefined peak current level, the subconverter operates in DCM, and the inductive energy transferred to the output is fixed within one cycle. When the load current decreases, the output voltage drops slower and switching occurs less frequently, which leads to the decrease in the switching frequency. At heavy load with predefined peak current level, the subconverter operates in CCM. When load current increases, more switching is needed to transfer the energy to output which leads to the increase in the switching frequency. For light load output, a lower switching frequency means smaller switching loss and higher efficiency. For heavy load output, a higher switching frequency means a small current ripple, small voltage ripple and smaller conduction loss.

Figure 9:
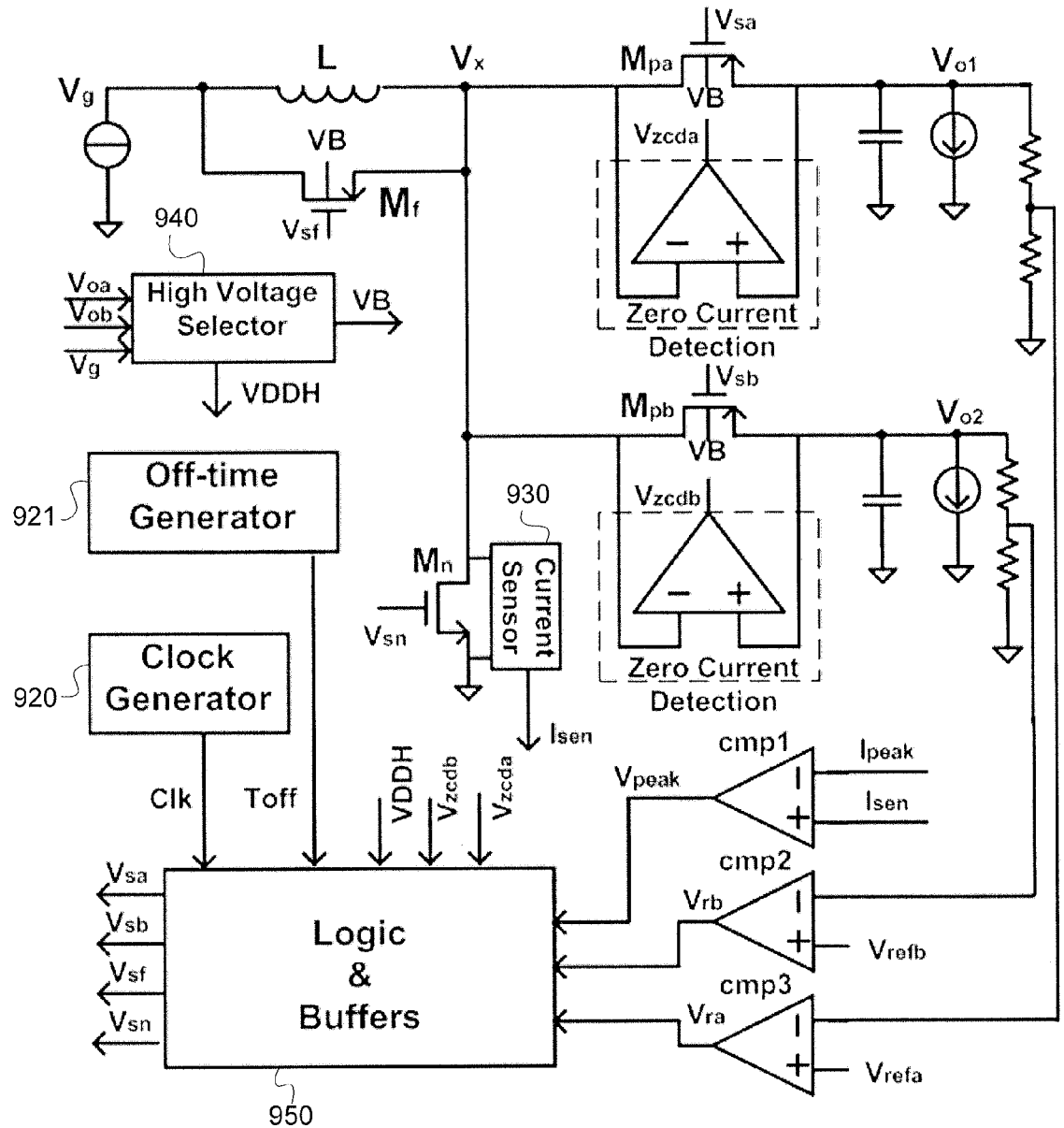
FIG. 9 is a block diagram illustrating the structure of a SIMO boost DC-DC converter in accordance with another embodiment of the present invention.
Figure 10:
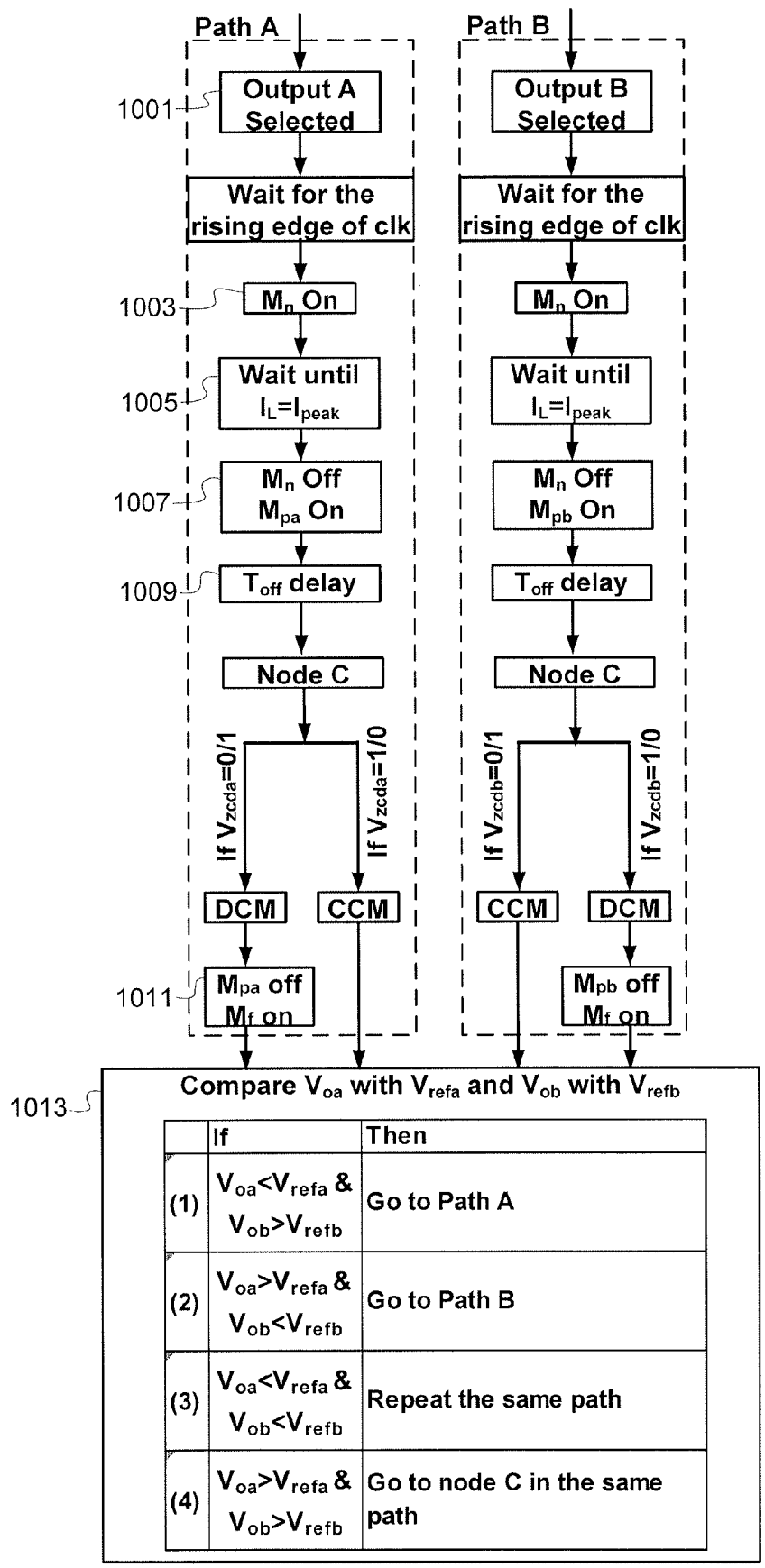
FIG. 10 is a flowchart illustrating the operation of the SIMO boost converter of FIG. 9.

FIG. 9 shows a schematic diagram 900 of SIMO boost DC-DC converter in accordance with another exemplary embodiment of the present invention. The main switch is a power NMOS $M_n$, and two power PMOSs $M_{pa}$ and $M_{pb}$ are used for synchronous rectification to achieve high efficiency. The comparators cmp1, cmp2, and cmp3 are used to control the inductor peak current $I_{peak}$ and detect output voltages $V_{oa}$ and $V_{ob}$, respectively. The topology of active diode technique is used to implement zero current detection (ZCD). For DCM operation, this ZCD can block the negative current flow through these bidirectional switches $M_{pa}$ and $M_{pb}$. A clock generator 920 is used to generate a high frequency clock (Clk) to synchronize the system. An off-time generator 921 is used to generate a suitable off-time ($T_{off}$) for energy transfer and frequency limitation for different applications. The off-time $T_{off}$ can be zero in some applications. As shown in FIG. 10, the $T_{off}$ provides a delay before the system compares the outputs and references. If $T_{off}=0$, the system will start to compare the outputs and references right after $I_L$ reaches $I_{peak}$. If the signal from the Zero Current Detection unit is available immediately after $I_L$ reaches $I_{peak}$, the next operation will be performed at the next high frequency clock cycle. In this case, it is possible for the switching frequency to be equal to the high frequency clock to charge up the outputs. A high voltage selector 940 is used to select the highest voltage from $V_g$, $V_{oa}$ and $V_{ob}$ to power the substrate of the PMOS (VB), and a buffer. A current sensor 930 is used to detect the NMOS current for control. The logic and buffer control circuit 950 can generate the proper gate driver voltages for the switches.

Similar to the system shown in FIG. 1, the two sub-converters shown in the FIG. 9 can operate in CCM or DCM. The flowchart 1000 depicted in FIG. 10 explains the operational principle of the converter of FIG. 9 at different operation modes of the proposed method. Path A starts with accumulating and transferring energy for output A for the previous cycle and ends with accumulating and transferring energy for output A or output B at the next cycle. Path B starts with accumulating and transferring energy for output B for the previous cycle and ends with accumulating and transferring energy for output B or output A at the next cycle. As shown in FIG. 10, DCM or CCM operation of sub-converter A and sub-converter B are determined by $V_{zcda}$ and $V_{zcdb}$. For sub-converter A, if $V_{zcda}=0$ is defined to determine as DCM, $V_{zcda}=1$ is for CCM. Alternatively, if $V_{zcda}=1$ is defined to determine as CCM, $V_{zcda}=0$ is for DCM. Similar DCM and CCM operation determination can be applied to sub-converter B with $V_{zcdb}$.

In one example, output A is selected at stage 1001. At the next rising edge of the clock Clk, main switch $M_n$ is turned on to charge the inductor at stage 1003 until $I_L$ is determined to have reached the peak inductor current at stage 1005. Then, main switch $M_n$ is turned off and output switch $M_{pa}$ is turned on to transfer energy to output A at stage 1007. After the time $T_{off}$ delay is reached at stage 1009, if output A is operating in DCM (determined based on $V_{zcda}$ as described above), $M_{pa}$ is turned off and $M_f$ is turned on at stage 1011. If output A is operating in CCM, the process 1000 does nothing. Then, for both DCM and CCM operations, the process 1000 next either (1) returns to path A; (2) goes to path B; (3) repeats path A; or (4) goes to node C in path A (i.e., detects the DCM or CCM operation and waits for an indication that an output voltage is less than its corresponding reference voltage) based on a comparison of the output voltages at outputs A and B to their corresponding reference voltages (as shown at stage 1013).

The control techniques described herein can also be applied to buck (output voltage smaller than input voltage), boost (output voltage larger than input voltage), flyback (output voltage having different polarity from input voltage), non-inverting (output voltage having same polarity as input voltage), and other different converter topologies. It will be appreciated that different converter topologies are suitable for different applications in a wide variety of applications (e.g., cell phone batteries, advanced integrated circuits, backlighting, etc.).

Figure 11:
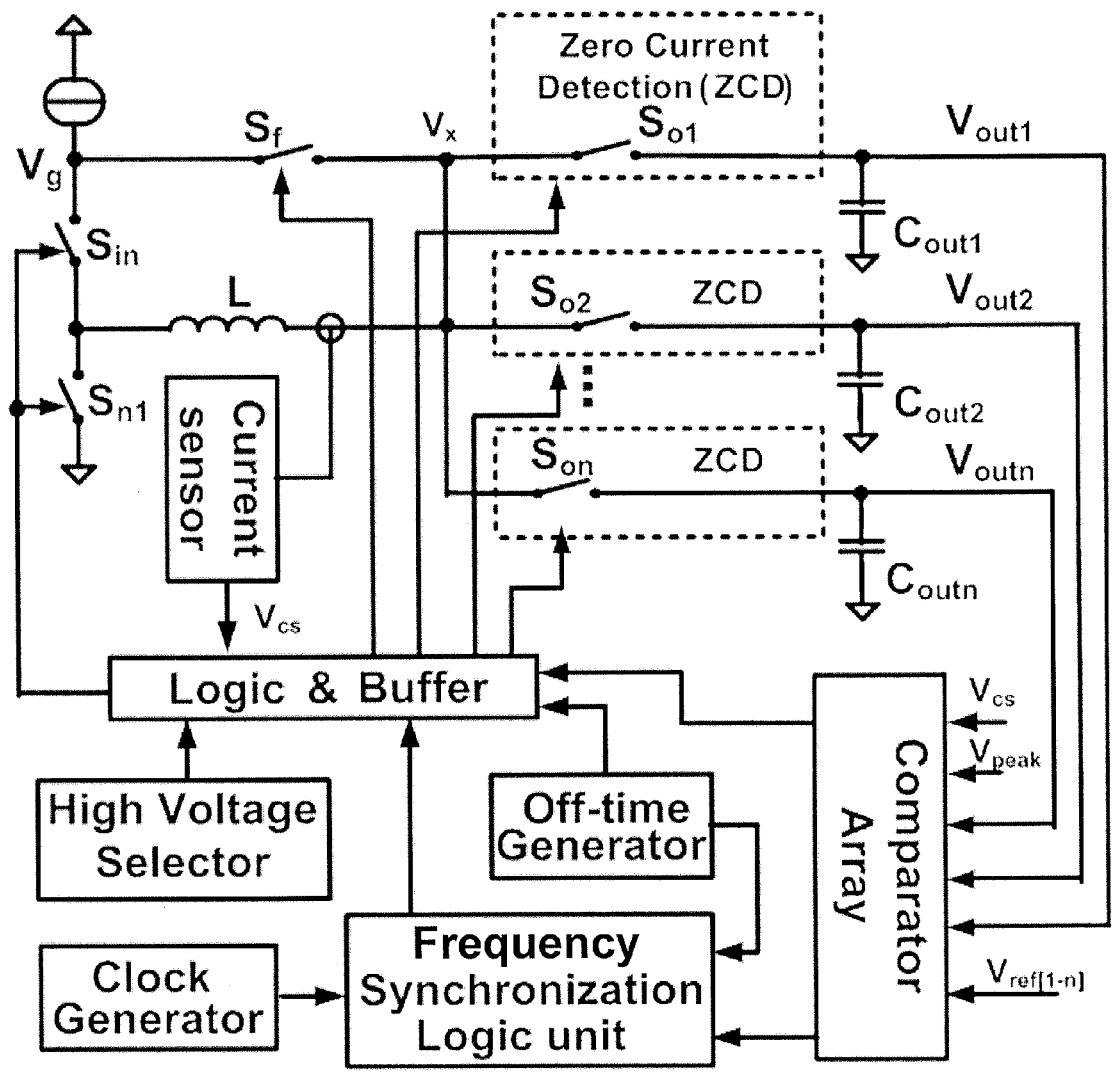
FIG. 11 is a block diagram illustrating the structure of a SIMO buck converter according to an embodiment of the present invention.

For example, FIG. 11 depicts an exemplary embodiment of a SIMO buck DC-DC converter 1100. The input switch $S_{in}$ and the output switch $S_{oi}$ are used to transfer energy to output i and accumulate energy at inductor as well. The switch $S_{n1}$ and the output switch $S_{oi}$ are used to dump the inductive energy to the output i. In DCM operation, switch $S_f$ is turned on when inductor current is decreased to zero to suppress the inductor ringing.

Figure 12:
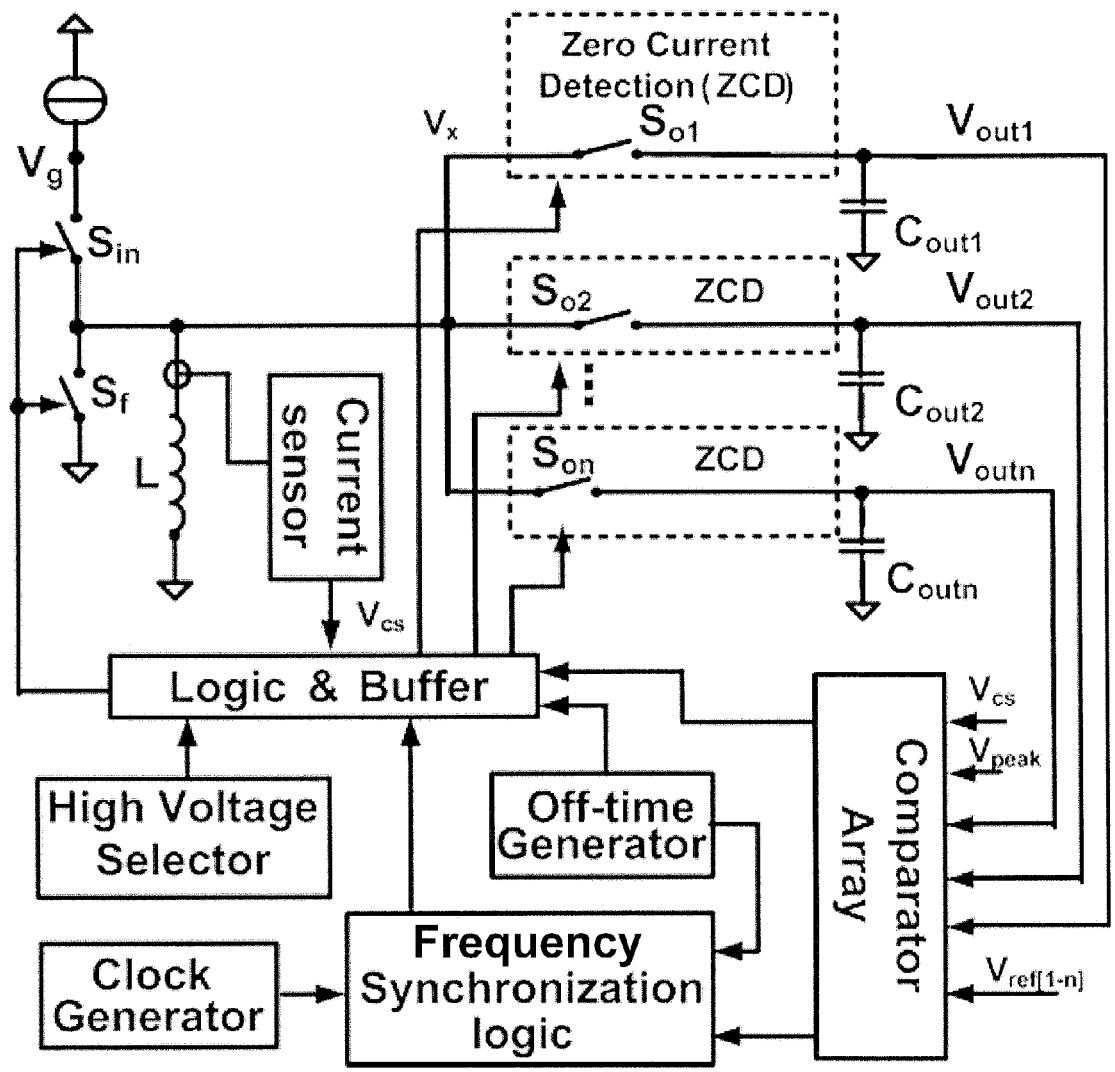
FIG. 12 is a block diagram illustrating the structure of a SIMO flyback converter according to an embodiment of the present invention.

FIG. 12 depicted an exemplary embodiment of a SIMO flyback DC-DC converter 1200. The input switch $S_{in}$ is used to accumulate energy at inductor. The output switch $S_{oi}$ is used to dump the inductive energy to the output i. In DCM operation, switch $S_f$ is turned on when inductor current is decreased zero to suppress the inductor ringing.

Figure 13:
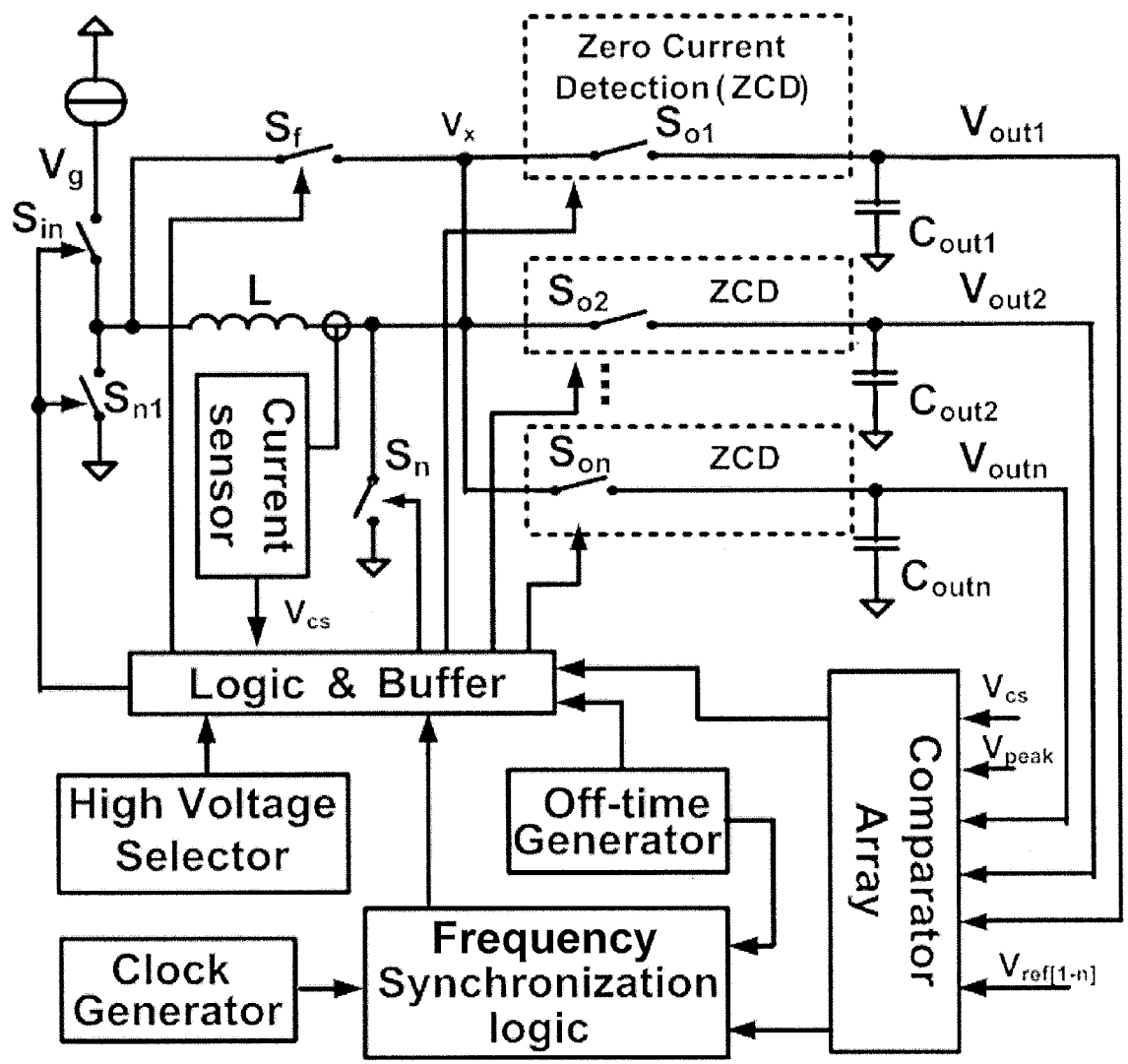
FIG. 13 is a block diagram illustrating the structure of a SIMO non-inverting flyback converter according to an embodiment of the present invention.

FIG. 13 depicted an exemplary embodiment of a SIMO non-inverting flyback DC-DC converter 1300. The input switch $S_{in}$ and the switch $S_n$ are used to accumulate energy at inductor. The switch $S_{n1}$ and the output switch $S_{oi}$ are used to dump the inductive energy to the output i. In DCM operation, switch $S_f$ is turned on when inductor current is decreased zero to suppress the inductor ringing.

Figure 14:
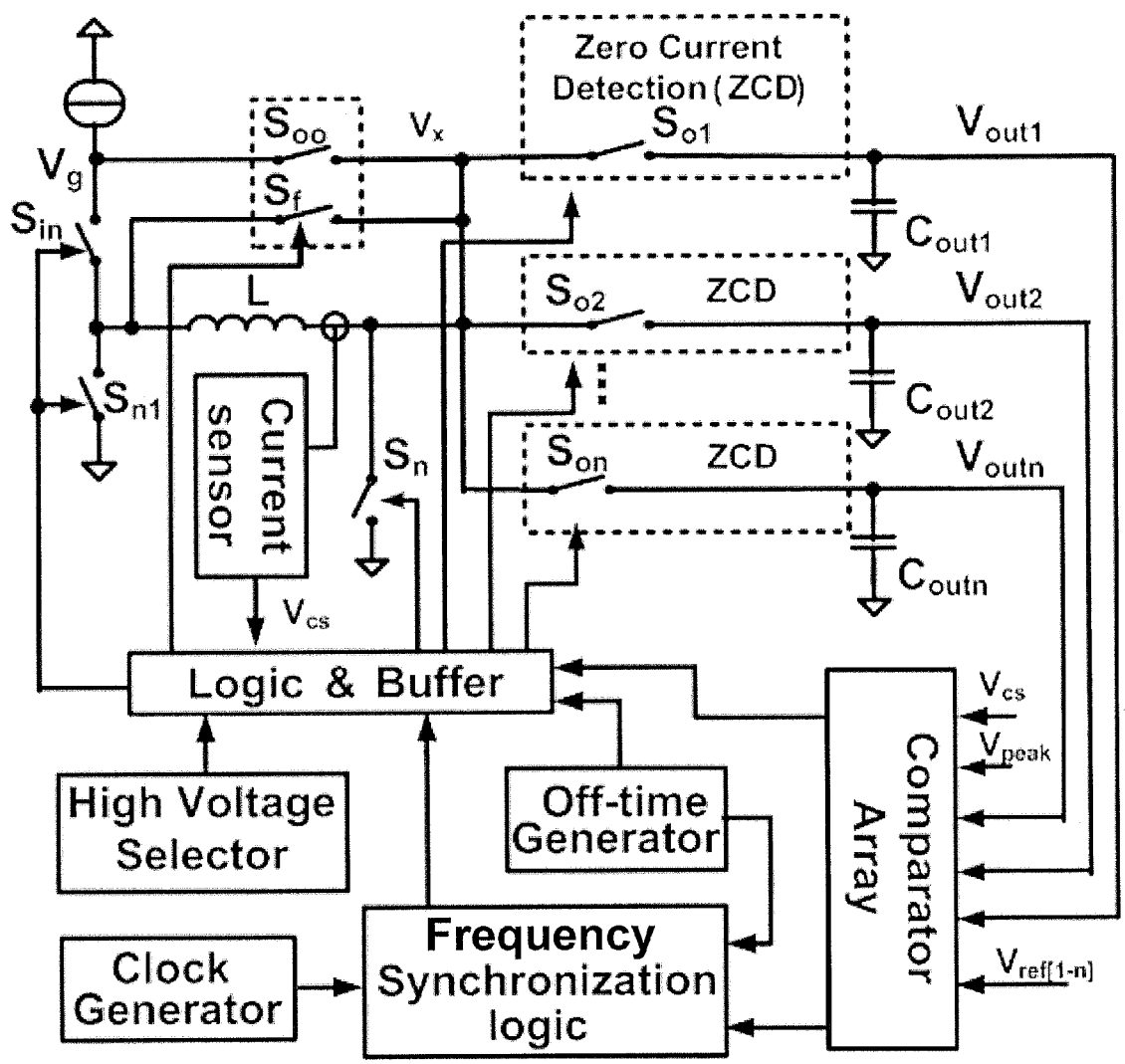
FIG. 14 is a block diagram illustrating the structure of a SIMO converter that can be configured to boost, buck, flyback and non-inverting flyback according to an embodiment of the present invention.

By rearranging or adding switches to the power stage, a single embodiment can achieve different kinds of regulators such as boost converter, buck converter, flyback converter, non-inverting flyback converter, as depicted by the exemplary embodiment of a SIMO converter 1400 shown in FIG. 14. If the switch $S_{in}$, is always on, the switch $S_{oo}$ is used as a freewheeling switch, and the switch $S_{n1}$ is always off, the circuit acts as a SIMO boost DC-DC converter, and the operation is similar to what was described with respect to FIG. 1. If the switch $S_n$ is always off and the switch $S_{oo}$ is used as a freewheeling switch, the circuit acts as a SIMO buck DC-DC converter, similar to the configuration shown in FIG. 11. If the switch $S_n$ is always on and the switch $S_{n1}$ is always off, the circuit acts as a SIMO flyback DC-DC converter, and the operation is similar to the configuration shown in FIG. 12. If the switch $S_{oo}$ is used as a freewheeling switch, the circuit acts as a SIMO non-inverting flyback DC-DC converter, and the operation is similar to the configuration shown in FIG. 13. For all the above cases, a small switch $S_f$ paralleling with the switch $S_{oo}$, can be used as a freewheeling switching to short the inductor at DCM operation. With this additional switch $S_f$, switch $S_{oo}$ will always be turned off for boost, buck, and non-inverting flyback operation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A DC-DC switching regulator, comprising:
   at least one power source for providing electrical energy;
   an inductive energy storage element for accumulating and transferring the electrical energy from the at least one power source to a plurality of outputs;
   a main switch for controlling energy accumulation at the inductive energy storage element;
   a comparator corresponding to the inductive energy storage element for detecting whether an inductor current has reached a peak inductor current level;
   a plurality of output switches for controlling energy transfer to each of the plurality of outputs;
   at least one comparator corresponding to the plurality of outputs;
   a freewheel switch coupled in parallel with the inductive energy storage element; and
   a controller, configured to coordinate the plurality of output switches and the main switch so as to periodically transfer accumulated energy from the inductive energy storage element to each of the plurality of outputs for generating a regulated DC voltage at each of the plurality of outputs based on detecting that the inductor current has reached the peak inductor current level, and wherein the coordination further comprises adjustment of a sequence, based on the load at each respective output, in which the accumulated energy is transferred to the plurality of outputs, wherein the adjustment of the sequence based on the load at each respective output includes comparing output voltages of each of the plurality of outputs with an associated reference voltage by the at least one comparator corresponding to the plurality of outputs.

2. The switching regulator of claim 1, wherein the controller further comprises:
   a clock generator for generating a high frequency reference clock signal, wherein the clock signal is used in adjusting switching frequencies associated with the main switch and the plurality of output switches of the regulator based on the loads at the plurality of outputs; and
   a logic and buffer unit for controlling the main switch, the freewheel switch, and the plurality of output switches.

3. The switching regulator of claim 2, wherein the frequency of the reference clock signal is an integer multiple of each of the switching frequencies of the regulator.

4. The switching regulator of claim 2, wherein the at least one comparator corresponding to each of the plurality of outputs is used to control the accumulated energy transferred to the corresponding output so as to maintain a constant voltage level at the corresponding output.

5. The switching regulator of claim 2, wherein the logic unit is configured to control operation of the main switch, the plurality of output switches, and the freewheel switch.

6. The switching regulator of claim 1, wherein the controller is further configured to provide different switching frequencies for the main switch with respect to charging of at least two different outputs based on the load at each respective output.

7. The switching regulator of claim 6, wherein the switching frequency corresponding to a particular output increases when the load at the particular output increases and decreases when the load at the particular output decreases.

8. The switching regulator of claim 6, wherein the controller is configured to assign a different number of switching cycles of the main switch for the at least two different outputs based on the load at each respective output.

9. The switching regulator of claim 8, wherein transfer of accumulated energy to an output that is assigned multiple switching cycles occurs in consecutive switching cycles.

10. The switching regulator of claim 1, wherein, within a switching cycle, the controller is configured to close the main switch so as to accumulate the electrical energy in the inductive element; close one of the plurality of output switches so as to transfer the accumulated electrical energy from the inductive element to the respective output that requires energy; and close the freewheel switch to short an inductor when inductor current decreases to zero.

11. The switching regulator of claim 1, wherein each of the main switch, the freewheel switch, and the plurality of output switches includes a transistor.

12. The switching regulator of claim 1, wherein the DC-DC switching regulator is a multiple-output boost converter.

13. The switching regulator of claim 1, wherein the DC-DC switching regulator is a multiple-output flyback converter.

14. The switching regulator of claim 1, wherein the DC-DC switching regulator is a multiple-output non-flyback converter.

15. The switching regulator of claim 1, wherein the DC-DC switching regulator is a multiple-output converter capable of boost, flyback and non-inverting flyback configurations.

16. The switching regulator of claim 1, wherein the plurality of outputs have positive output voltages, negative output voltages, or a combination of positive and negative output voltages.

17. A method for controlling a DC-DC switching regulator, the method comprising:
   activating a main switch to accumulate energy at an inductive energy storage element;
   determining, by a comparator corresponding to the inductive energy storage element, whether an inductor current has reached a peak inductor current level;
   deactivating the main switch, based on determining that the inductor current has reached the peak inductor current level, to transfer accumulated energy from the inductive energy storage element to a plurality of outputs;
   adjusting, by a controller, a sequence in which the accumulated energy is transferred to the plurality of outputs based on the load at each respective output, wherein the adjusting includes comparing output voltages of each of the plurality of outputs with an associated reference voltage by the at least one comparator corresponding to the plurality of outputs;

determining, by the controller, whether to operate each output in discontinuous conduction mode (DCM) or continuous conduction mode (CCM) based on the load at each respective output; and transferring the accumulated energy from the inductive energy storage element to each of the plurality of outputs based on the adjusted sequence and the determined modes.

18. The method of claim 17, wherein, during transfer of accumulated energy to each of the plurality of outputs, a switching frequency of the main switch is different with respect to charging of at least two different outputs, wherein the switching frequency associated with the main switch for the at least two different outputs is based on the load at each respective output.

19. The method of claim 18, wherein the switching frequency associated with the main switch is synchronized with an edge of a high frequency reference clock signal.

20. A DC-DC switching regulator, comprising:
at least one power source for providing electrical energy;
an inductive energy storage element for accumulating and transferring the electrical energy from the at least one power source to a plurality of outputs;
a main switch for controlling energy accumulation at the inductive energy storage element;
a plurality of output switches for controlling energy transfer to each of the plurality of outputs;
a freewheel switch coupled in parallel with the inductive energy storage element; and
a controller, configured to coordinate the plurality of output switches and the main switch so as to periodically transfer accumulated energy from the inductive energy storage element to each of the plurality of outputs for generating a regulated DC voltage at each of the plurality of outputs, wherein the coordination further comprises comparison of output voltages with associated reference voltages, and adjustment of a sequence in which the accumulated energy is transferred to the plurality of outputs;
wherein the controller further comprises:
a clock generator for generating a high frequency reference clock signal, wherein the clock signal is used in adjusting switching frequencies associated with the main switch and the plurality of output switches of the regulator based on the loads at the plurality of outputs;
at least one comparator corresponding to each of the plurality of outputs;
a comparator for detecting whether the inductor current has reached a peak inductor current level; and
a logic and buffer unit for controlling the main switch, the freewheel switch, and the plurality of output switches.

* * * * *